United States Patent
Chafekar et al.

(10) Patent No.: US 11,866,145 B2
(45) Date of Patent: Jan. 9, 2024

(54) DEVICE AND METHOD FOR SELF-CORRECTING A SENSED PHYSICAL PARAMETER, DRONE OR UNMANNED AERIAL VEHICLE

(71) Applicant: Infineon Technologies AG, Neubiberg (DE)

(72) Inventors: Saumitra Sanjeev Chafekar, Munich (DE); Ankit Kalbande, Munich (DE)

(73) Assignee: Infineon Technologies AG, Neubiberg (DE)

( * ) Notice: Subject to any disclaimer, the term of this patent is extended or adjusted under 35 U.S.C. 154(b) by 618 days.

(21) Appl. No.: 16/565,919

(22) Filed: Sep. 10, 2019

(65) Prior Publication Data

US 2020/0115039 A1 Apr. 16, 2020

(30) Foreign Application Priority Data

Oct. 16, 2018 (EP) .................................. 18200717

(51) Int. Cl.
*B64C 17/00* (2006.01)
*B64C 39/02* (2023.01)
*B64D 45/00* (2006.01)

(52) U.S. Cl.
CPC .............. *B64C 17/00* (2013.01); *B64C 39/02* (2013.01); *B64D 45/00* (2013.01); *B64U 2201/10* (2023.01)

(58) Field of Classification Search
CPC ... B64C 17/00; B64C 39/02; B64C 2201/141; B64C 2201/14; B64C 39/024; B64D 45/00; G01C 25/00; G01C 5/06; G01D 3/036; G01D 21/00; G01D 3/028; G01D 18/00; G01D 3/02; G01L 19/04; G01L 27/005; G01L 25/00
USPC ............................................................ 701/3
See application file for complete search history.

(56) References Cited

U.S. PATENT DOCUMENTS

| | | | |
|---|---|---|---|
| 7,584,069 B2 | 9/2009 | Guichard et al. | |
| 2003/0233205 A1 | 12/2003 | Horne et al. | |
| 2010/0191494 A1 | 7/2010 | Yamashita | |
| 2014/0278185 A1 | 9/2014 | Landmann | |
| 2016/0293019 A1* | 10/2016 | Kim | G05D 1/0291 |
| 2017/0153122 A1* | 6/2017 | Tang | G01C 23/00 |

(Continued)

FOREIGN PATENT DOCUMENTS

| | | |
|---|---|---|
| CN | 1348541 A | 5/2002 |
| CN | 101738287 A | 6/2010 |
| CN | 101743479 A | 6/2010 |

(Continued)

*Primary Examiner* — Maceeh Anwari
(74) *Attorney, Agent, or Firm* — Slater Matsil, LLP

(57) ABSTRACT

A device for sensing a physical parameter includes a sensor element configured for measuring the physical parameter and for outputting a corresponding measured signal, wherein the measured signal is influenceable by a sensor drift of the sensor element. The device includes a corrector for correcting the measured signal output by the sensor element to obtain a corrected signal, wherein the corrector is configured for evaluating the measured signal to determine a drift effect of the sensor drift on the measured signal and for correcting the measured signal so as to at least partially compensate for the drift effect. The device includes a signal output configured for outputting the corrected signal.

14 Claims, 12 Drawing Sheets

(56) References Cited

U.S. PATENT DOCUMENTS

2018/0073951 A1  3/2018  Venkatraman et al.

FOREIGN PATENT DOCUMENTS

| CN | 105571778 | A |   | 5/2016 |
| CN | 106030431 | A |   | 10/2016 |
| CN | 106403940 | A |   | 2/2017 |
| CN | 108225400 | A |   | 6/2018 |
| EP | 3002574 | A1 | * | 9/2015 |
| EP | 3002574 | A1 |   | 4/2016 |

* cited by examiner

DEVICE AND METHOD FOR SELF-CORRECTING A SENSED PHYSICAL PARAMETER, DRONE OR UNMANNED AERIAL VEHICLE

This application claims the benefit of European Application No. 18200717.9, filed on Oct. 16, 2018, which application is hereby incorporated herein by reference.

TECHNICAL FIELD

The present disclosure relates to a device for sensing a physical parameter such as a sensing device. The disclosure further relates to a drone or an unmanned aerial vehicle comprising such a device. The disclosure further relates to a method for sensing a physical parameter and relates in particular to a method and a realization of an adaptive drift compensation filter for barometric pressure sensors.

BACKGROUND

Physical parameters such as a temperature, pressure, weights, volume or the like are measured using sensing elements that sense or measure the physical parameter. The devices suffer from sensor drifts leading to inaccurate results.

It is thus an object of embodiments to provide for devices for sensing a physical parameter, for devices carrying such devices and for methods for measuring physical parameters that allow for precise results.

SUMMARY

Embodiments provide a device for sensing a physical parameter. The device comprises a sensor element configured for measuring the physical parameter and for outputting a corresponding measured signal, wherein the measured signal is influenceable by a sensor drift of the sensor element. The device comprises a corrector for correcting the measured signal output by the sensor element so as to obtain a corrected signal, wherein the corrector is configured for evaluating the measured signal to determine a drift effect of the sensor drift on the measured signal and for correcting the measured signal so as to at least partially compensate for the drift effect. The device comprises a signal output configured for outputting the corrected signal.

A drone or unmanned aerial vehicle in accordance with an embodiment comprises such a device.

A method for sensing a physical parameter comprises correcting a measured signal so as to obtain a corrected signal, the measured signal being obtained by measuring the physical parameter using a sensor element and by providing the measured signal. The measured signal is influenced by a sensor drift of the sensor element. The method comprises evaluating the measured signal to determine a drift effect of the sensor drift on the measured signal, comprises correcting the measured signal so as to at least partially compensate for the drift effect and comprises outputting the corrected signal.

Further embodiments are defined in the dependent claims.

BRIEF DESCRIPTION OF THE DRAWINGS

Embodiments are described herein making reference to the appended drawings, in which.

DETAILED DESCRIPTION OF ILLUSTRATIVE EMBODIMENTS

Figure 1:
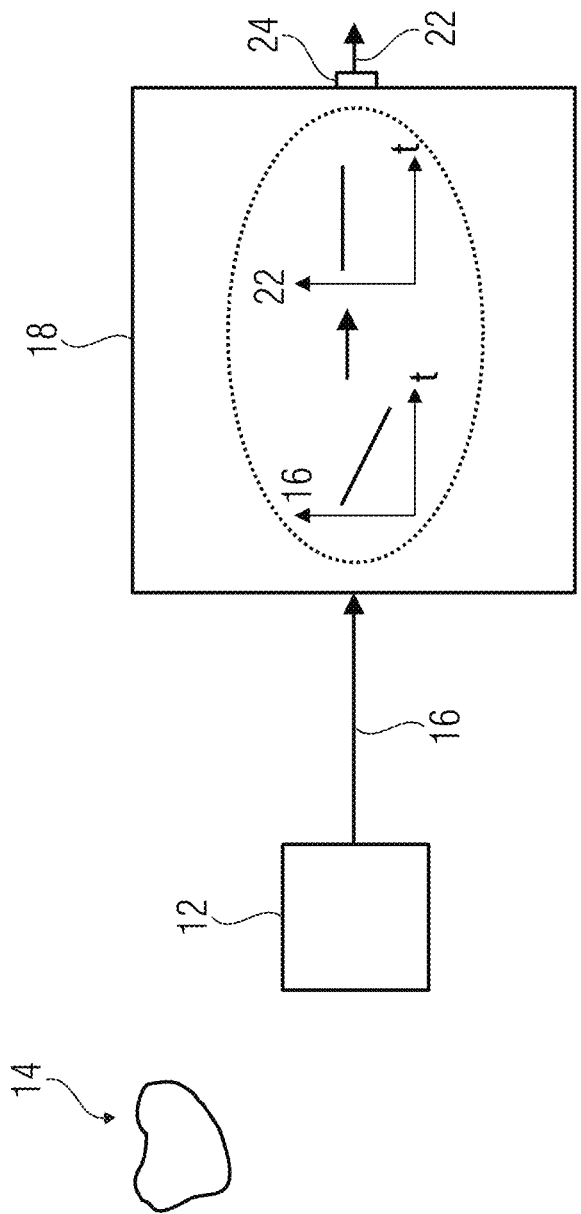
FIG. 1 shows a schematic block diagram of a device according to an embodiment.

Equal or equivalent elements or elements with equal or equivalent functionality are denoted in the following description by equal or equivalent reference numerals even if occurring in different figures.

In the following description, a plurality of details is set forth to provide a more thorough explanation of embodiments of the present invention. However, it will be apparent to those skilled in the art that embodiments of the present invention may be practiced without these specific details. In other instances, well known structures and devices are shown in block diagram form rather than in detail in order to avoid obscuring embodiments of the present invention. In addition, features of the different embodiments described hereinafter may be combined with each other, unless specifically noted otherwise.

In the following, reference is made to measuring a physical parameter. By non-limiting example only, such a physical parameter may be a temperature, a distance, a pressure, a volume, a volume flow, a weight, an electrical current, electrical voltage, electrical capacity, a magnetic field or any other suitable parameter to be measured. For measuring the physical parameter, sensor elements may be used providing for a respective measured signal. Although some of the embodiments described hereinafter may refer to a barometric pressure sensor, the scope of the embodiments is not limited hereto but relates to any other suitable physical parameter to be measured with a respective sensor element.

FIG. 1 shows a schematic block diagram of a device or sensing device 10 according to an embodiment. The device 10 comprises a sensor element 12 configured for measuring a physical parameter 14. The sensor element is 12, for example and in accordance with the description herein, but not limited hereto a barometric pressure sensor for measuring a barometric pressure. The drift effect may be caused by a temperature variation of the device 10. The drift effect itself may be represented in a change in the pressure value provided by the sensor element 12 with respect to the change in temperature.

The sensor element 12 is configured for outputting or providing a measured signal or measurement signal 16, i.e., a signal being proportional to the physical parameter 14. The measured signal may be an uncompensated signal, e.g., an uncompensated pressure signal. According to an embodiment, the measured signal 16 may be an electrical signal such as a current signal or a voltage signal. According to an embodiment, the measured signal 16 may be any other signal adapted to provide for information indicating the physical parameter 14 to be measured. An example for such signals may be a pressure in a pneumatic or hydraulic system or the like. The measured signal 16 is influenceable by a sensor drift of the sensor element 12. A sensor drift may be triggered, induced or caused by a change or instability of the device 10 that leads the sensor element 12 to output a variant measured signal 16 in case of a constant physical parameter 14. An example for such a drift effect is a temperature induced drift which may cause the sensor element 12 to face varying mechanical boundary conditions due to thermally induced changes in materials of the sensor element 12 or other components of the device 10.

The device 10 comprises a corrector 18 being configured for correcting the measured signal 16 so as to obtain a compensated or corrected signal 22. The corrector 18 is configured for evaluating the measured signal 16 to determine the drift effect of the sensor drift on the measured signal 16. The corrector 18 is configured for correcting the measured signal 16 to at least partially compensate for the drift effect. The corrector 18 may evaluate the measured signal 16 with regard to information that indicates that the measured signal 16 currently suffers from a drift effect. Based thereon, the corrector 18 may be configured for correcting the measured signal 16 for the drift effect. The more accurate the determination of the drift effect is, the higher the amount of the drift effect that is compensated in the corrected signal 22. The device 10 comprises a signal output 24 configured for outputting the corrected signal 22.

The drift effect is indicated, by non-limiting example only, as a variation of the measured signal 16 over time t at constant physical parameter 14. By way of example, the corrected signal 22 is corrected so as to be also constant over time t for constant physical parameter 14.

Figure 2:
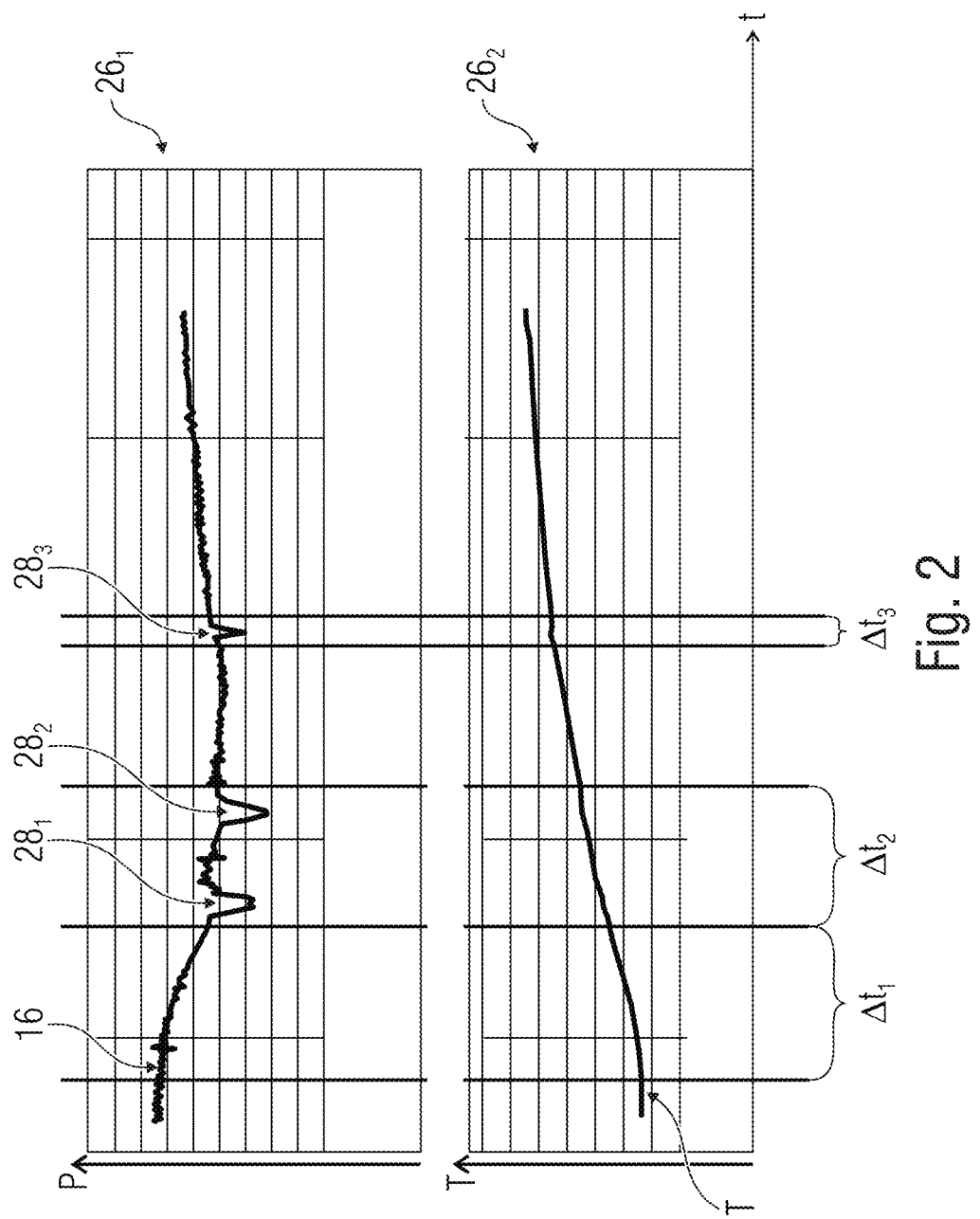
FIG. 2 shows two schematic measurement graphs of a device suffering from drift, the diagrams having a common time-axis and illustrating a measured signal and an ambient temperature.

FIG. 2 shows two schematic diagrams or measurement graphs of a device suffering from drift, the diagrams having a common time-axis t, wherein a diagram $26_1$ shows values of an example measured signal 16 over time t indicating a pressure P, wherein a diagram $26_2$ illustrates an ambient temperature T of the device carrying the sensor element. Values and tendencies are of a schematic nature only so as to describe the effect that may occur. Over time t, ambient temperature T of the sensor element measuring pressure P increases as indicated in diagram $26_2$. The real or actual pressure P being measured as physical parameter is kept constant with the exception of events $28_1$, $28_2$ and $28_3$ during which the device is lifted, causing a reduction in the pressure. That is, the barometer/altimeter is kept stationary with exception of events $28_1$ to $28_3$ and is exposed to a steady rise in temperature only. The measured signal 16 indicates that when the temperature rises, the measured pressure falls during a time interval $\Delta t_1$. It is to be noted that a pressure change induced by temperature change may also rise as well as fall with regard to the amplitude of the measured signal 16.

Such change in pressure is considered as false change and may be detected, separated and corrected from the actual environmental barometric pressure change. For instance, if the barometer is also moving vertically in order to determine the altitude, e.g., during events $28_1$, $28_2$ and $28_3$, such differentiation is technically challenging but implemented by embodiments described herein.

Figure 3:
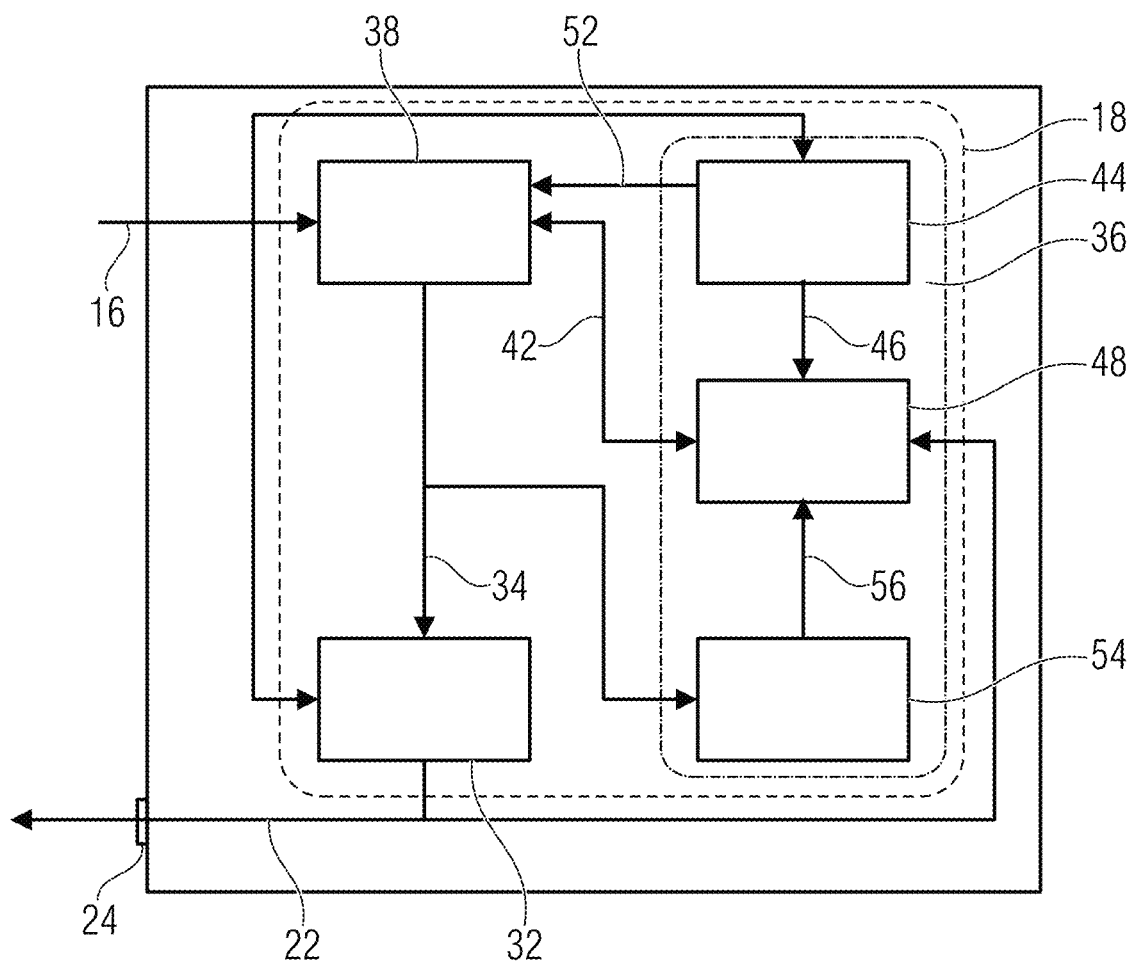
FIG. 3 shows a schematic block diagram of a device according to an embodiment, comprising a corrector having a compensator being configured for combining the measured signal with a correction factor so as to provide for a corrected signal.

FIG. 3 shows a schematic block diagram of a device 30 according to an embodiment. The device 30 comprises the corrector 18 having a compensator 32 being configured for combining the measured signal 16 with a correction factor 34 so as to provide for the corrected signal 22 at the signal output 24. The correction factor may correct for, amongst other things, non-linearities or deviations from a reference or correct value.

The device 30 further comprises a drift evaluator 36 configured for evaluating the measured signal 16 to determine the drift effect and for adapting the correction factor 34 so as to at least partially compensate for the drift effect. For example, the correction factor 34 may be provided by a correction factor updater 38. The correction factor updater 38 may comprise, for example, a filter or a database that outputs the correction factor 34 based on a calibrated value. The correction factor updater 38 may be configured for providing different types or values of the correction factor 34 for different scenarios that may be determined, measured or generated during a calibration procedure. For example, different values of the correction factor may be determined for different values of the physical parameter at which the device 30 is operated. The corrector 18 is configured for correcting the measured signal 16 using the correction factor 34, wherein the corrector 18 comprises the correction factor updater 38 configured for updating the correction factor 34 responsive to a determined change in the physical parameter and for updating the correction factor responsive to a determined drift effect, i.e., both, the variation in the physical parameter and/or the drift effect lead to an updated correction factor 34, thus setting the device into a condition to accurately measure the physical parameter in the current condition.

A reference value 42 of the physical parameter, i.e., the value to be sensed, such as a reference pressure, may be an input of the correction factor updater 38. This allows obtaining a varying correction factor 34 based on a varying reference value 42. For example, a function or polynomial or a lookup table may be stored or implemented in the correction factor updater 38 for obtaining or determining the correction factor 34 to be used based on the reference value 42. That is, the correction factor updater 38 is configured for adapting the correction factor 34 applied to the measured signal 16.

According to an embodiment, the reference value 42 is adapted by the drift evaluator 36 such that deliberately and in a calculated manner the reference value 42 is adapted or falsified, e.g., with regard to a calibration value, so as to compensate for the drift effect. The falsification may compensate for the drift effect at least partially such that an implicitly corrected correction factor 34 may be used for obtaining the corrected signal 22.

The drift evaluator 36 is configured for evaluating the measured signal 16 to determine the drift effect and for adapting the correction factor 34 at least indirectly via the correction factor updater 38 so as to compensate for the drift effect. Thereby, information contained in the measured signal 16 may be used so as to allow for an autonomous detection of the drift effect. Autonomous may relate to a determination based on the data the device 30 determines during its operation, e.g., using the measured signal 16 and possibly further information such as a signal indicating the magnitude of the drift effect. The signal indicating the magnitude of the drift effect may be a signal that is related to a source of drift. In embodiments that are influenced by a temperature drift, such a signal may be a temperature signal, wherein further embodiments also relate to pressure induced drifts, force induced drifts, and speed induced drifts or the like. That is, the detection and the compensation of the drift effect are based on the information contained in the measured signal 16.

The corrector 18 is configured for updating the correction factor 34 responsive to a detected fast variation in the measured signal 16 and/or response to a detected slow variation of the correction factor 34. Embodiments relate to drift bounds/boundaries (i.e., a range within which the drift could vary). Such drift bounds may be identified or determined, for example, experimentally. The terminology "fast variation" may be used to address the changes/variations in measured sensor values observed that significantly go beyond these drift bounds. These fast changes/variations (e.g., caused due to an actual change in pressure) may be differentiated from the drift change, for example, through a slope filter. The terminologies "slow variation" may be used to address the changes/variations in measured sensor values observed close to these drift bounds. These features are possibly difficult to trace in measured pressure values, but may be observed in a recursively adapted correction factor. As the correction factor 34 may be updated in a closed-loop manner, an example slow variation may indicate that a drift effect occurs leading to a false detection of a changed physical parameter that erroneously causes the correction factor updater 38 to update the correction factor 34. Embodiments at least partially prevent such effects by detecting variations in the correction factor 34.

The corrector 18 may comprise a measured signal evaluator 44 that may also be referred to as a fast pressure change (FPC) detection filter. The measured signal evaluator 44 may receive the measured signal and may be configured for evaluating the measured signal 16 with respect to a fast variation of the measured signal 16. For example, and as described in connection with FIG. 5, the measured signal evaluator 44 may evaluate a slope of the measured signal 16. In case the slope of the measured signal 16 indicates a rapid change, for example, determinable by a steepness of the slope, the measured signal evaluator 44 may output a trigger signal 46. The trigger signal 46 may indicate the determined rapid change being associated with, for example, a change of the measurement environment of the physical parameter and therefore indicates that the reference value 42 has to be updated.

The corrector 18 may comprise a reference value updater 48 which may be configured for repeatedly or continuously providing the reference value 42 and which may be configured for adapting the reference value 42 based on the trigger signal 46. This allows updating/providing a value of the reference value (e.g., pressure). The reference value updater 48 is in communication with the compensator 32 and may receive a signal indicating the corrected signal 22.

The corrector 18 may be configured for using a variable correction factor 34 for correcting the measured signal 16. The corrector 18 may comprise a correction factor evaluator 54 configured for evaluating the correction value 42 with respect to a slow variation of the correction factor. The corrector 18 is configured for associating a slow change of the correction factor 34 having a magnitude being larger than a threshold value with the drift effect, i.e., a sufficiently large change in the correction factor has to occur within a predetermined amount of time. The corrector 18 is configured to update the correction factor 34 responsive to the drift effect.

The pressure drift compensator 32 may use the correction factor 34 to compensate a pressure drift based on the correction factor and may output the compensated/corrected pressure value 22. The correction factor 34 may be updated through the correction factor updater/evaluator 38 and associated blocks. The correction factor updater 38 may recursively correct the value of the correction factor 34 to compensate the pressure drift using the trigger 46 and inputs from further modules such as measured signal evaluator 44 and correction factor evaluator 54. The reference value updater 42 and the correction factor updater 38 are coordinated to serve such a purpose. The reference value updater 48 may update the reference pressure which may follow the trend line for actual pressure change. The reference pressure is used to compute the correction factor 34. Further, the correction factor updater 38 updates the correction factor to compensate the pressure drift caused due to temperature change that causes the drift effect. The corrector 18 calculates the final compensated pressure, i.e., the corrected signal 22, using the correction factor 34 computed by the pressure drift compensator 32 of the corrector 18.

In contrast and in view of a barometric pressure sensor and for the fast pressure change detection in the measured signal evaluator 44, the slope represented by a pressure drift over a period of time may be identified as low frequency activity. Using this finding, the sub-module 44 may use the slope filter over the non-compensated pressure signal followed by thresholding to differentiate the drift from actual pressure change signal.

The measured signal evaluator 44 may be configured for determining and outputting at least one coefficient 52, i.e. further evaluation results, e.g., in a filter coefficient bank or parameters. The at least one coefficient 52 may be signaled to the correction factor updater 38 and may allow for adapting a filter, e.g., a low-pass filter, used for reducing noise. For example, the coefficient 52 may be a low-pass filter coefficient, which determines the cutoff frequency of a low-pass filter of the correction factor updater 38. This low-pass filter may be used to remove the noise from calculated correction coefficients, i.e., correction factors 34. Such noise may be induced by a fast change in pressure such that the at least one coefficient 52 calculated or determined or provided by the measured signal evaluator 44 may be used to adapt the low-pass filter for the correction factor 34. For example, if the rate of change of the physical parameter (pressure) due to actual change in pressure is well above the upper bound of a potential drift, then it could be categorized as a fast varying pressure value for the correction parameter. Similarly, if the actual change in pressure navigates close or within the bounds of potential drift, then this could be categorized as slow varying values of pressure with respect to the correction parameter.

The corrector 18 may further comprise a correction factor evaluator 54 that may also be referred to as a slow pressure change (SPC) detection filter. The correction factor evaluator 54 may be in communication with the correction factor updater 38 and may receive a signal indicating the correction factor 34. When compared to FPC, SPC may use the adapted correction factor to detect slow variation and FPC may use a measured pressure value to detect fast variation. The correction factor evaluator 54 may be configured for evaluating the correction factor 34 with respect to a slow variation of the correction factor 34. The correction factor evaluator 54 thus allows for slow pressure change detection and takes care of segregating the drift signal at a finer level, when compared to the measured signal evaluator 44. Segregating the drift signal at the finer level allows further reducing or even minimizing incorrect drift detection. Unlike the measured signal evaluator 44 operating on the measured signal 16, the correction factor evaluator 54 may use or operate on the slope detection filter on the correction factor 34.

Together, the evaluators 44 and 54 may be referred to as a pressure drift segregator taking care of the pressure changes induced by the drift and due to actual change in pressure. As incorrect identification of the non-linear/linear drift represented by the sensor may result in incorrect pressure value post-compensation, the drift segregation is performed by complementary evaluators 44 and 54.

The correction factor evaluator 54 may output a trigger signal 56 to the reference value updater 48. This allows the reference value updater 48 to provide for the reference value 42 based on the corrected signal 22 unless a respective trigger signal 46 and/or 56 is received. Based on a respective reception of the trigger signal 46 and/or 56, the reference value updater 48 may adapt the outputted reference value 42 so as to at least partially compensate for the drift effect. Thereby, operation of the correction factor updater 38 and the compensator 32 is at least partially deliberated from the drift effect afterwards.

Thus, the measured signal 16 is itself evaluated by use of the measured signal evaluator 44. In combination, effects of a change in the measured signal 16 and the evaluation performed, namely by use of the correction factor evaluator 54 is used to determine the drift effect and to compensate for the same.

Figure 4:
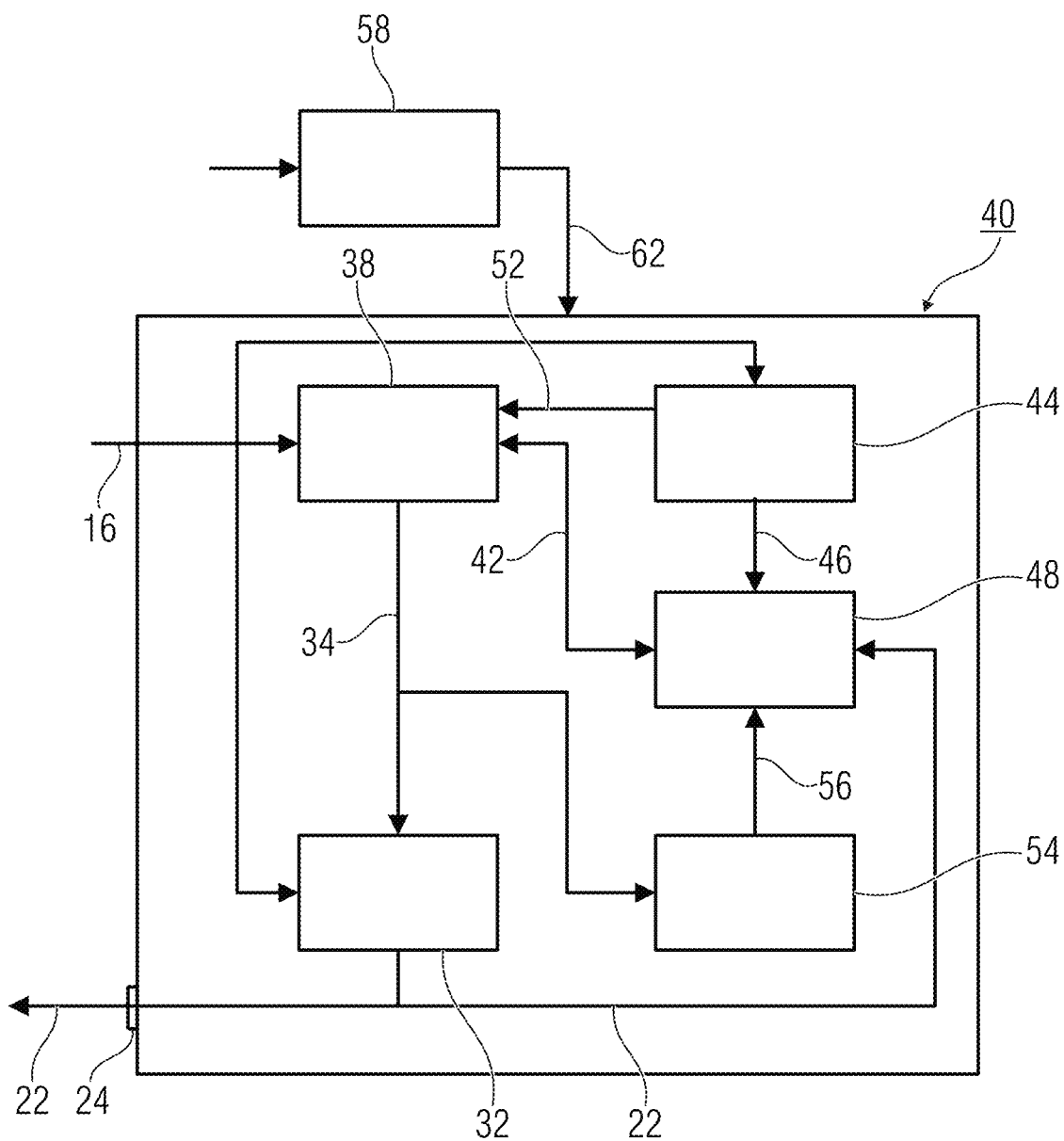
FIG. 4 shows a schematic block diagram of a device according to an embodiment, comprising the features as described in connection with FIG. 3 and additionally comprising a drift detector being configured to output a trigger signal indicating a presence of a drift effect.

FIG. 4 shows a schematic block diagram of a device 40 according to an embodiment, comprising the same features as device 30 and additionally comprising a drift detector 58 being configured to output a trigger signal 62 indicating a presence of a drift effect, wherein the device 40 is configured for compensating for the drift effect when being triggered accordingly by the trigger signal 62. That is, based on a presence or absence of the drift effect, the compensation may be switched on or off so as to save computational efforts and/or to avoid false compensations.

In the following, reference will be made to example configurations of the respective blocks of devices 30 and 40. The examples may refer to sensing a pressure, the sensor element being affected by a drift effect based on a temperature change.

As stated in previous sections, final pressure sensor measurement value could be represented as a function of raw temperature $T_{raw}$ and raw pressure $P_{raw}$ (i.e., unprocessed or uncompensated pressure and temperature, the measured signal 16).

$$P = f(P_{raw}, T_{raw}) \tag{1}$$

This function could be represented in a polynomial form.

$$P = P_{nc} = f(P_{raw}, T_{raw}) = \sum_{\substack{x \in N \\ y \in N}} C_{xy} P_{raw}^x T_{raw}^y \tag{2}$$

$C_{-xy}$ is a constant which is identified through the calibration process. For example, through the experimentation the calibration constant $C_{-ab}$ may be identified to be mis-calibrated or unfit for sensing in connection with the device under use, e.g., due to mechanical stress, change in physical form factors or the like, and hence leading to the drift in measured pressure value. The drift in pressure may be observed, e.g. when the temperature changes. Here temperature change is the example trigger for drift in pressure. The drift induced by this mis-calibrated/unfit constant may or may not be linear in nature and so the behavior of this drift is possibly unpredictable. This unpredictable drift induced by mis-calibrated constant calls for an adaptive drift correction. This drift correction is capable of segregating the drift behavior from actual pressure change behavior and correcting the drift from final measurement. In order to correct this mis-calibrated/unfit constant $C_{-ab}$, it is multiplied with a correction constant $C_{-f}$ (correlation factor 34). This correction constant may be adapted on the fly to get the compensated pressure $P_{-comp}$, the corrected signal 22.

$$P_{comp} = \sum_{\substack{x \in N \\ y \in N \\ x \neq a \\ y \neq b}} C_{xy} P_{raw}^x T_{raw}^y + C_f C_{ab} P_{raw}^a T_{raw}^b \tag{3}$$

$$P_{comp} = \sum_{\substack{x \in N \\ y \in N}} C_{xy} P_{raw}^x T_{raw}^y + (C_f - 1) C_{ab} P_{raw}^a T_{raw}^b \tag{4}$$

$$P_{comp} = P_{nc} + (C_f - 1) C_{ab} P_{raw}^a T_{raw}^b \tag{5}$$

Variables x and y are the indexes corresponding to the degree of variable $P_{raw}$ and $T_{raw}$ respectively in the polynomial to calculate the measured pressure value. $C_{xy}$ corresponds to the constant associated with element of polynomial uniquely identified by x and y together. Both x and y belong to the set of natural numbers N. N is a set of natural number where $N \in (0, 1, 2, 3, \ldots)$. The indices a and b are the identifier of drift causing element in the pressure measurement polynomial (2). Where x=a and y=b, this uniquely identifies the constant $C_{ab}$ whose mis-calibration is causing the drift.

In other words, FIG. 4 shows a generalized overview of a device according to an embodiment. Not every drift induces error in the readout of the physical parameter, e.g., pressure. Hence, the entire filter kicks in only when false pressure change event is detected by means of the pressure drift detector 58. When block 58 receives a drift causing component (e.g., temperature) it detects and enables the entire filter for compensation of pressure. Otherwise, the filter may become transparent and passes input as it is to its output.

Input to the filter may be a non-compensated pressure value, i.e., a measured signal 16, read directly out of the sensor element which is fed to "correction factor updater" 38, the compensator 32 and to the measured signal evaluator 44, i.e., the FPC detection filter. The compensator corrects the error caused due to drifting of the sensor taking into account a correction factor dynamically adjusted within the correction factor updater 38. FPC 44 determines, from uncompensated pressure values, if the barometer is moving vertically in a rapid fashion, resulting in a rapid change of pressure. In this situation, the compensation factor/correction factor 34 may be adjusted in such a way that the filter slows down a correction process as real instantaneous pressure is repeatedly updated in the reference value updater 48. This captures the high-pass activities in real barometric pressure changes if any. Once, the pressure sensor is stabilized at a certain height, the measured signal evaluator 44 may instruct the reference value updater 44 to lock reference pressure update to the currently obtained height, i.e., a respective trigger may be outputted by the measured signal evaluator 44.

The correction factor 34 may then be updated accordingly for new reference pressure 42, which restores a rate of error compensation in the compensator 32. The measured signal evaluator 44 may separate the rate of change of pressure with respect to altitude change from a rate of change of pressure with respect to drift, i.e., temperature. Similarly, the correction factor evaluator 54 (SPC detection filter) may determine a change in pressure due to slow vertical movements in pressure sensor and separates out these changes from erroneous drift induced pressure changes. In order to determine this, the correction factor evaluator 56 may take into account a rate of change of the correction factor and may extract a feature from it that determines a required slow movement of the pressure sensor.

The evaluators 44 and 54 may be implemented as slope detection filters and may be adapted as a complement with respect to each other. The evaluator 44 may not be able to separate some errors as some slow-moving features might still get undetected by the measured signal evaluator 44. These errors are then corrected by the correction factor evaluator 54.

A correction factor that dictates the amount and magnitude by which compensation will be carried out is computed or determined depending on a difference between the reference pressure and an uncompensated pressure. The rate at which the correction factor is updated may be determined by its step size, which is controlled through controlling the coefficient 52.

The filter can partially or completely be implemented as a design and method on micro-processor, controller and/or as a hardwire logic such as an application-specific integrated circuit (ASIC).

Embodiments allow differentiating between real pressure change events from false changes caused by sensor drift. Further, embodiments allow for adaptively compensating for varying drift effects. Further, embodiments allow for adaptively correcting drifts in the sensor. Further, a post-reflow calibration in the end system or in the embedded system is possible but not required, i.e., such a step can possibly be omitted from manufacturing. Embodiments allow for low costs of ownership at system level and can be generalized for any type of drifts caused pre-calibration or post-calibration of any sensor types. Embodiments improve the yield at production level and may improve accuracy impressions of scenarios where a sensor can exhibit drifting. Embodiments considerably improve the feasibility of a sensor for application-like altitude hold in UAVs. Embodiments provide filters that trigger selectively, i.e., only when drifting occurs, thereby improving performance at a system level by reducing the burden overall.

Three tasks for drift compensation are drift detection, drift segregation, and pressure correction. The proposed model tends to address these three challenges to achieve a compensated pressure value. The drift detector 58 identifies when the measured value starts drifting. It addresses the problem of drift detection. The trigger for drift or the conditions causing the drift may previously have been identified and modeled to trigger the drift compensation process. For example, the trigger for the drift may be identified through experimentation or use cases.

Figure 5:
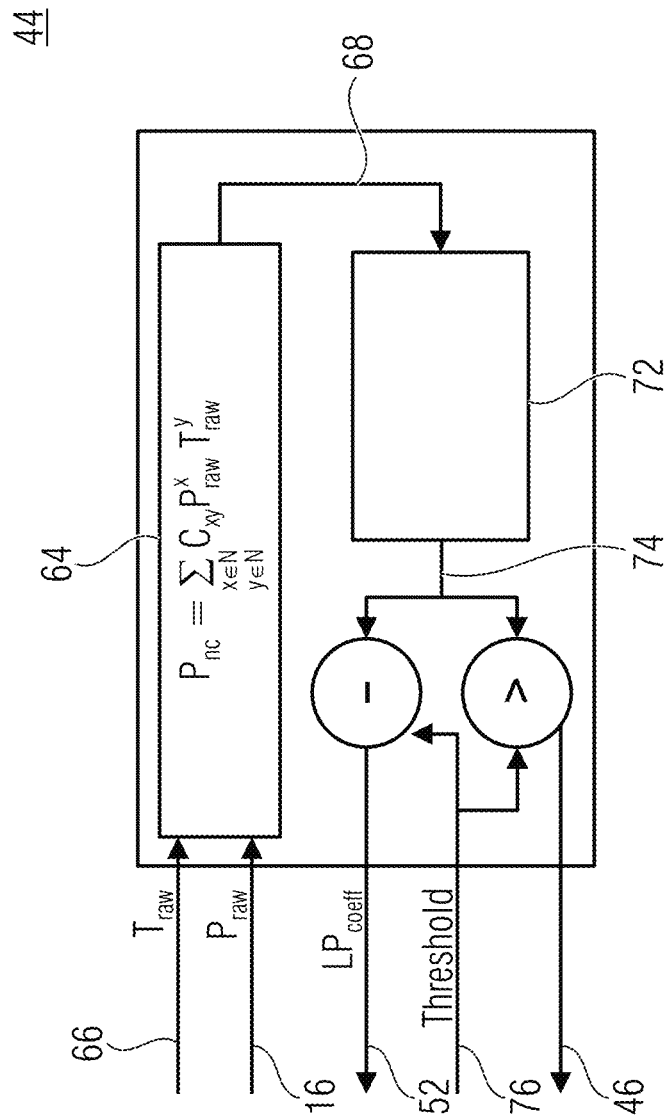
FIG. 5 shows a schematic block diagram of a measured signal evaluator that may be incorporated into a device in accordance with an embodiment.

FIG. 5 shows a schematic block diagram of the measured signal evaluator 44 that may be incorporated into the device 10, 20 and/or 40. The measured signal evaluator 44 may comprise a pre-compensator 64 being configured for combining the measured signal 16 ($P_{raw}$), a signal 66 that contains information about facts that might lead to drifts or falsifications or modifications with regard to the physical parameter. An example is the temperature that affects the pressure to be determined as described above, e.g., the signal 66 may be a temperature signal ($T_{raw}$). The pre-compensator 64 may be configured for combining signals 16 and 66 using a calibrated correction factor $C_{xy}$ as described in connection with equation (2). The pre-compensator 64 may be configured for outputting an uncompensated signal 68, e.g., being equal or proportional to the determined value ($P_{nc}$).

The measured signal evaluator 44 may comprise a filter 72 that allows for an evaluation of the uncompensated signal 68, for example, with regard to a slope thereof, an average value over time or the like. For example, the filter 72 may be a transition detection slope filter configured for evaluating a steepness of the slope of the signal 68. A transition detection slop filter may be implemented as slope filter. A slope filter may be a convolution based filter with a custom ramp/slope wavelet which identifies rate of change of a signal with respect to slope represented by wavelet. It may be used for identifying how fast or slow a particular signal is changing in time domain. When the drift experienced by the sensor is higher than the predetermined threshold, (i.e., the bound of drift variation), then the slope filters deployed in FPC detector may be adapted accordingly.

The measured signal evaluator 44 may be configured for combining an output 74 of the filter 72 with a threshold value 76 to obtain the one or more coefficients 52 and the trigger signal 46. For example, the threshold 76 may be subtracted from the output 74, i.e., a magnitude or amount of the output 74 exceeding the threshold may result in the coefficient 52 that may be used to adapt the correction factor updater 38. Alternatively or in addition, the measured signal evaluator 44 may be configured for evaluating if the output 74 is larger than (alternatively larger than or equal to) the threshold 76, wherein in a positive case the trigger signal 46 may be provided and in a negative case providing the trigger signal 46 may be omitted. It is noted that checking the output 74 so as to be larger than (or equal) than the threshold 76 may also be converted, without any loss in information or functionality, to a check, if the output 76 is smaller than (or equal) a respective inverted threshold. For example, evaluation of steepness may be converted to an evaluation of flatness and vice versa. Accordingly, a subtraction may also be converted into an addition or multiplication such that embodiments described herein are not limited to the specific implementation illustrated and described in connection with the illustrated figures.

The measured signal evaluator 44 may be configured for evaluating the measured signal 16 with respect to a fast variation in the measured signal. The corrector 18 may be configured for associating a fast change of the measured signal 16 having a magnitude being greater than the threshold with a change of the physical parameter and for associating a fast change of the measured signal having a magnitude being smaller than the threshold value with the drift effect. The threshold for fast pressure change trigger (i.e., FPC threshold) may be based or even dictated by the measured pressure bounds within which the drift is observed. That is, the drift on the sensor may exhibit boundaries and varies between an upper bound and a lower bound. So given, the threshold can be set based on the upper bound of the drift boundaries in measured data, so that anything above this will be marked clearly as Fast Pressure Change. The criteria can be determined based on the experiments or study to judge the sensor for drift boundaries. Alternatively or in addition, the measured signal evaluator 44 may be configured for separating a drift component from the measured signal 16. The corrector 18 may be configured for adapting the reference value 42 of the physical parameter used for determining a correction value 34 being further used for correcting the measured signal 16 based on adapting filter coefficients 52.

In other words, the measured signal evaluator 44 (fast pressure change—FPC detector) may be used for drift identification which is one of the challenges in drift correction. Through lab measurements in a controlled condition, the pressure drift may be identified as a low frequency activity with a change in temperature. The measured signal evaluator 44 may be regarded as an important component in a drift detection module. It may use the transition detection slope filter to identify between non-compensated pressure $P_{nc}$ due to drift on the one-hand side and an actual change in pressure on the other side. The output 74 of the slope filter may be differentiated with the FPC threshold 76, this offset of the slope filter from the threshold, i.e., the coefficient 52/LPcoeff may be used as an adaptation parameter in subsequent block of the filters. The measured signal evaluator 44 may also generate a trigger FPC trigger, i.e., the trigger signal 46, which may be used to update the pressure reference.

Figure 6:
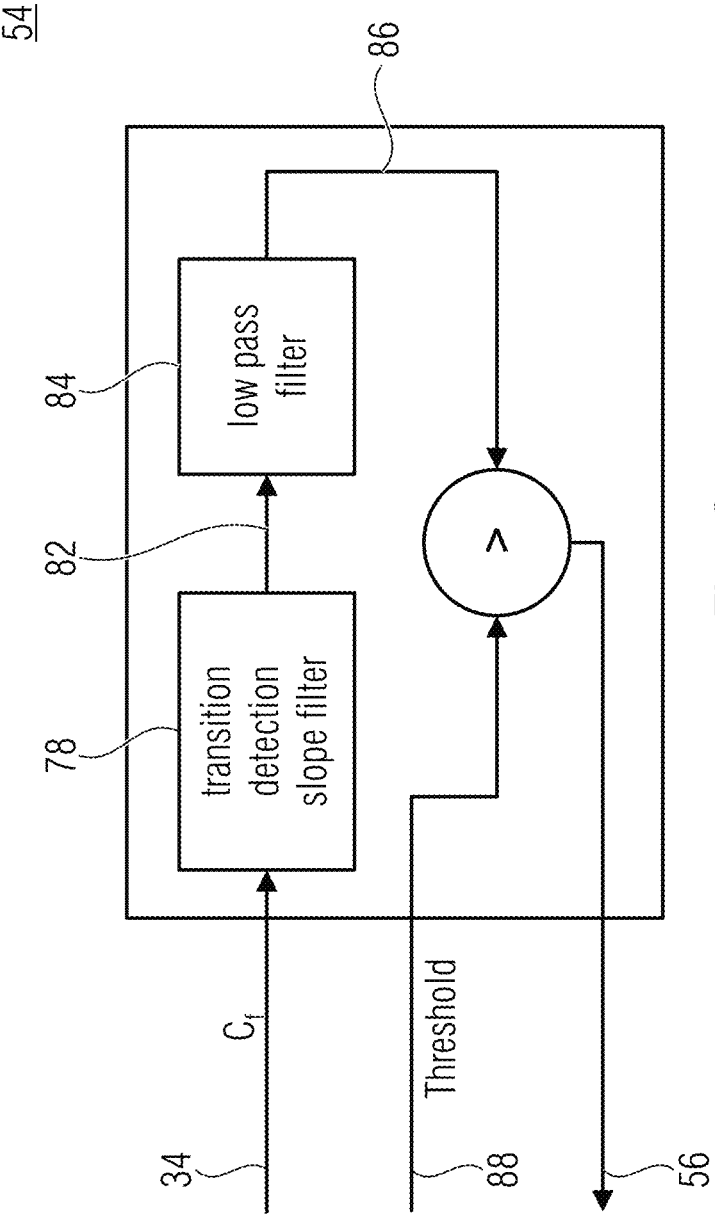
FIG. 6 shows a schematic block diagram of a correction factor evaluator which may be incorporated into a device in accordance with an embodiment.

FIG. 6 shows a schematic block diagram of the correction factor evaluator 54 which may be incorporated into the device 10, 30 and/or 40. The correction factor evaluator 54 is configured for receiving the correction factor 34 provided by the correction factor updater 38 and to output the trigger signal 56. For evaluating the correction factor 34, the correction factor evaluator 54 may comprise a filter 78 configured for outputting a signal 82 comprising information about a slope and/or a transition or variation of the correction factor 34 over time, i.e., different values of the correction factor 34 over time may form an input of the filter 78, e.g., in continuous or discontinuous form. The filter 78 may be a transition detection slope filter as described in connection with filter 72.

The signal 82 may be subjected to a low-pass filter 84 of the correction factor evaluator 54, wherein the low-pass filter 84 may be configured for outputting a filtered signal 86 that is based on the signal 82 and that comprises information with regard to slow variations of the correction factor 34 over time, based on an adjustment of the low-pass filter 84.

The correction factor evaluator 54 may be configured for comparing the signal 86, e.g., a magnitude thereof, against a threshold 88 being received, e.g., a preset value stored in the device 10, 30 and/or 40, similarly to the threshold 76. In case the change in the correction factor 34 exceeds the threshold 88, i.e., the value indicated in the signal 86 is larger than (or equal) the threshold 88, the correction factor evaluator 54 is configured for outputting the trigger signal 56.

In other words, the correction factor evaluator may be referred to as a slow pressure change (SPC) detector and may be used for drift detection. When compared to FPC detector 44 segregating the drift from actual pressure change signals, this segregated drift signal may have some actual pressure change components. The described SPC detector (correction factor evaluator) 54 may assist in differentiating the actual pressure change signal from a drift signal at a finer level. As shown in FIG. 6, it may use, receive and/or process the adapted correction factor 34 and may feed it to a transition detection slope filter followed by a low-pass filter. The processed correction factor Cf is compared with SPC threshold 88 to trigger SPC trigger 56. Like the FPC trigger 46, SPC trigger 56 is used to update the reference pressure. SPC threshold 88 is configured according to the expected sensitivity of SPC detector. SPC may be regarded as relevant or even most critical module to segregate between the change in pressure due to drift and due to actual pressure change. SPC may operate on this volatile borderline. And so, it is not always possible to segregate drift from measured signal with utmost precision. There may remain a risk of over-compensation and under-compensation which might add its own drift. In order to minimize this over/under-compensation, the sensitivity of the sensor may be marginally compromised. Thus, a trade-off between the sensitivity and expected drift correction may exist.

So, depending upon the use case and expected sensitivity to the measured sensor value, the SPC threshold may be determined experimentally pertaining to a given use case.

Figure 7:
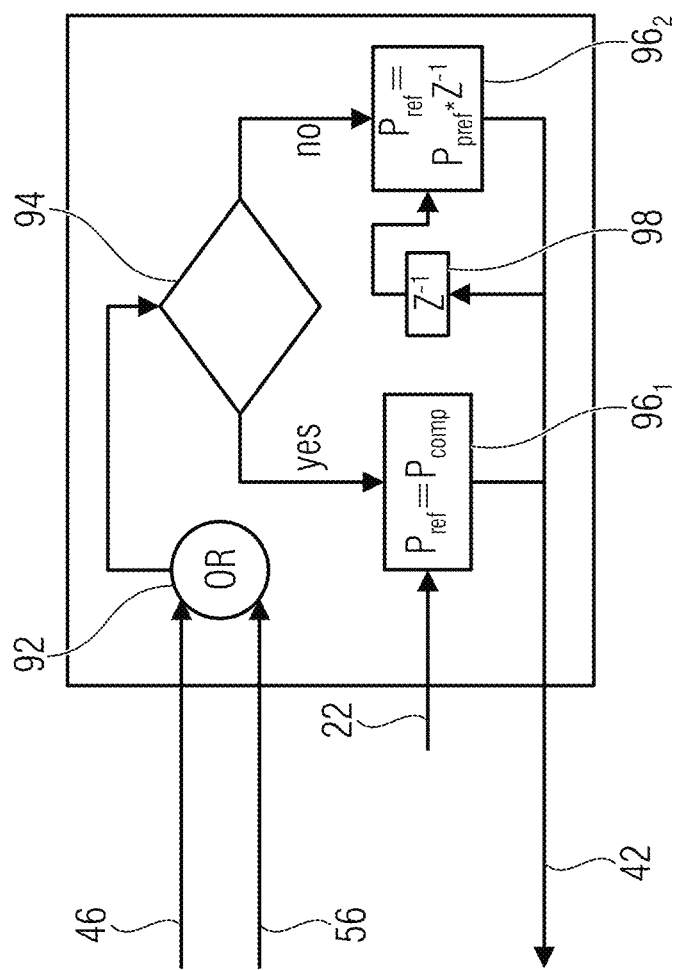
FIG. 7 shows a schematic block diagram of a reference value updater that may be incorporated into a device in accordance with an embodiment.

FIG. 7 shows a schematic block diagram of the reference value updater 48 that may be incorporated into the device 10, 30 and/or 40. If at least one of the trigger signals 46 and 56 is received from the measured signal evaluator, the correction factor evaluator respectively (see OR-block 92), a decision block 94, evaluating, whether at least one of the trigger signals 46 and 56 has been received, i.e., if the SPC trigger and/or the FPC trigger has been received may be answered with "yes" such that the actual reference value 42 is set to the compensated value $P_{comp}$, i.e., the corrected signal 22 using block 961. Alternatively, if none of the triggers 46 and 56 is received, a delay-block 98 in connection with a block 962 for setting the reference value 42 is configured for reusing the last reference value 42, i.e., the new reference value $P_{ref}$ 42 equals the delayed reference value $P_{ref}*z^{-1}$.

The reference value updater 48 may be configured for providing the reference value 42 for determination of the correction value 34 used for correcting the measured signal 16. The reference value updater 48 may be configured for using a determined corrected value of the physical parameter contained in the corrected signal 22 as reference value for a subsequent iteration of drift detection when no drift occurs and for updating the reference value in case a drift occurs. In case of the decision resulting in "yes" a drift occurs and the reference value 42 is updated. In case no drift occurs, i.e., "no", then the value of the previous iteration is reused by delaying it with the delay block 98.

In other words, the reference value updater may update the reference value/pressure depending on the triggers received from the FPC and SPC detector. This reference value is then used to compute the correction factor Cf for drift correction.

Figure 8:
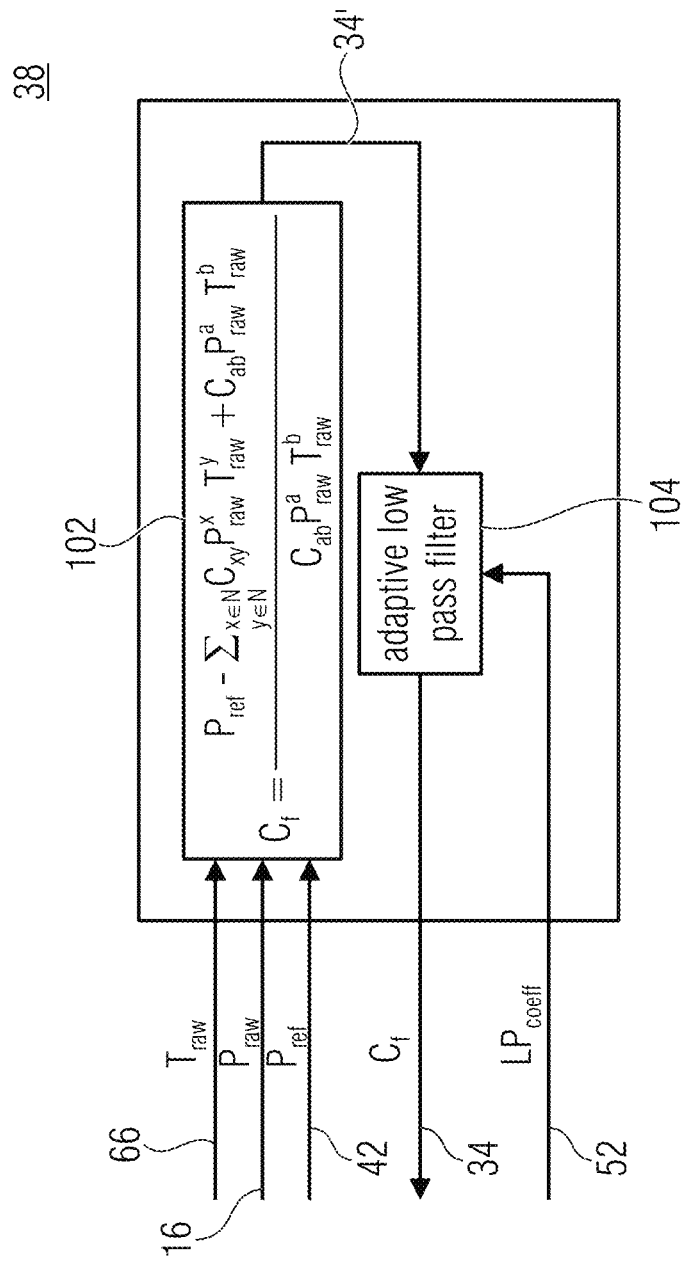
FIG. 8 shows a schematic block diagram of a correction factor updater that may be incorporated into a device in accordance with an embodiment.

FIG. 8 shows a schematic block diagram of the correction factor updater 38 configured to receive and use the measured signal 16, the signal 66, the reference value 42 and the at least one coefficient 52 so as to obtain an updated correction factor 34, the correction factor 34 being also referred to as Cf. The correction factor updater 38 may comprise a determiner 102 which may be at least a part of a determining unit such as a processor, a field-programmable gate array (FPGA), a microcontroller or a central processing unit (CPU). By combining the signals 16, 66 and 42 a correction factor 34' may be generated, for example, based on the polynomial $$C_f = \frac{P_{ref} - \sum_{\substack{x \in N \\ y \in N}} C_{xy} P_{raw}^x T_{raw}^y + C_{ab} P_{raw}^a T_{raw}^b}{C_{ab} P_{raw}^a T_{raw}^b}$$

wherein Cf may refer to the correction factor 34'.

The correction factor 34' may be filtered, for example, using a low-pass filter 104 that may adaptively be adjusted based on the at least one coefficient 52. The low-pass filter 104 may thus be referred to as an adaptive low-pass filter. The correction factor 34 may be obtained as a filtered version of the correction factor 34'.

For updating the correction factor 34 responsive to the determined change in the physical parameter, the correction factor updater 38 may be configured for using an updated reference value 42 of the physical parameter in a polynomial and for using the filter 104 for filtering the result 34' of the polynomial. The correction factor updater 38 may be configured for adapting filter parameters of the filter using the at least one coefficient 52 indicating the determined drift effect.

In other words, the correction factor updater 38 may be entitled to compute, determine, generate or provide the correction factor 34 (Cf.). This module determines the change in pressure between the non-compensated pressure and the reference pressure. Depending on this deviation from the expected behavior, the correction factor 34' is calculated. The computed or determined correction factor 34' is passed through an adaptive low-pass filter to dynamically suppress high-frequency activity induced by actual change in pressure.

Figure 9:
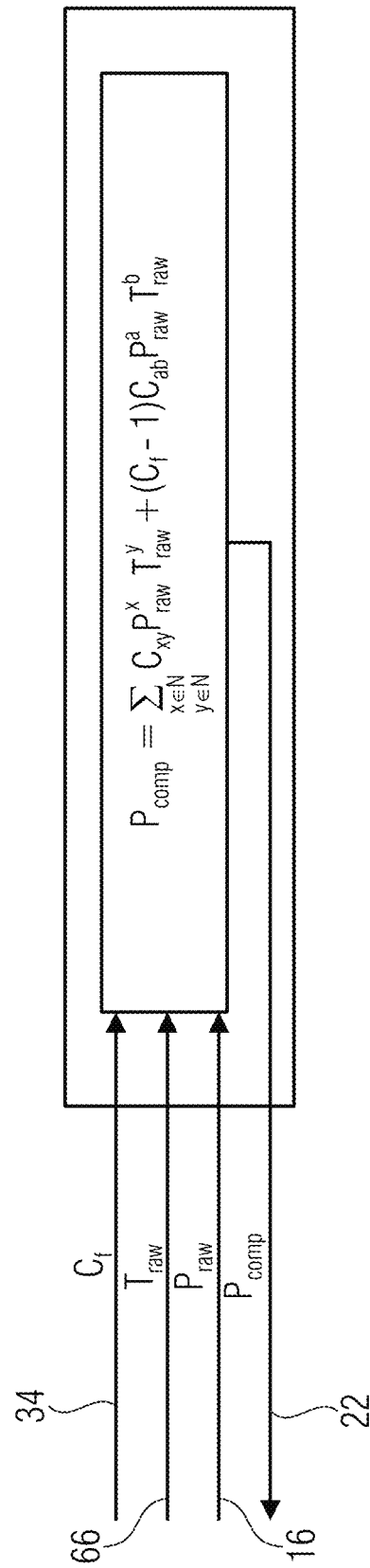
FIG. 9 shows a schematic block diagram of a compensator that may be incorporated into a device in accordance with an embodiment.

FIG. 9 shows a schematic block diagram of the compensator 32 according to an embodiment. The compensator 32 may be configured for combining signals 16, 34 and 66, for example, using the updated correction factor 34 only and/or using the calibrated correction factor in addition to the correction factor 34. For example, the compensator 32 may comprise a determining unit configured for determining the corrected signal 22 based on the polynomial $$P_{comp} = \sum_{\substack{x \in N \\ y \in N}} C_{xy} P_{raw}^x T_{raw}^y + (C_f - 1) C_{ab} P_{raw}^a T_{raw}^b$$

In other words, using the adapted correction value 34 from the correction factor updater 38, a drift compensated pressure, i.e., the corrected signal 22, is computed using the polynomial described above.

Figure 10:
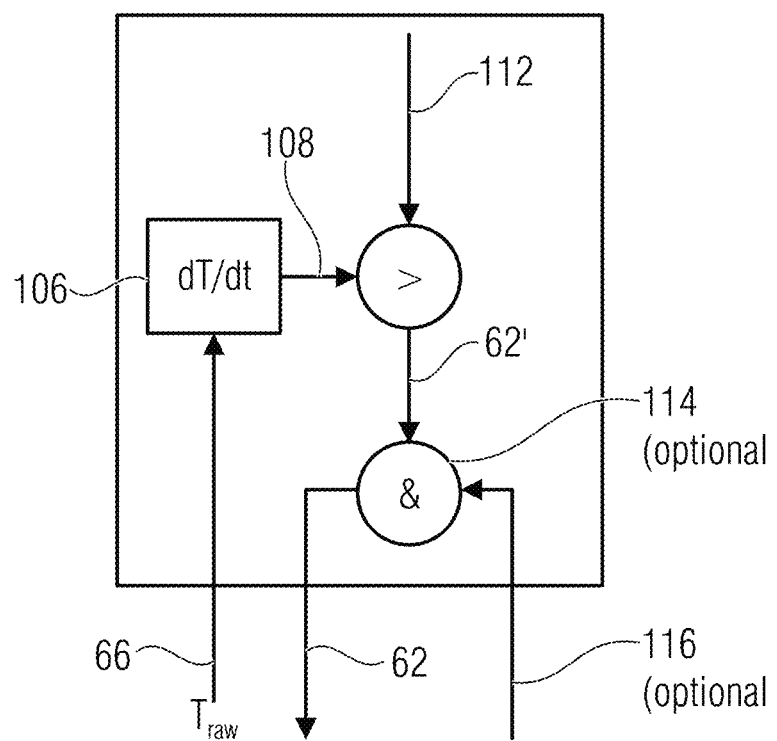
FIG. 10 shows a schematic block diagram of a drift detector being configured for detecting the presence of a drift effect with respect to a temperature variation, which may be incorporated into a device in accordance with an embodiment.

FIG. 10 shows a schematic block diagram of the drift detector 58 being configured for detecting the presence of a drift effect. The drift detector 58 may be configured for controlling the device 10, 20 or 40 so as to compensate for the drift effect responsive to the drift effect and so as to skip compensating the drift effect in case no presence of the drift effect is detected. For example, the drift detector 58 may receive the signal 66 carrying information about the physical parameter that is suitable to cause the drift effect. The drift detector 58 may comprise an evaluation unit 106 being configured for evaluating the signal 66. For example, the evaluation unit 106 may be configured for differentiating the signal 66, which is, in case of a temperature, formulated as dT/dt. A result 108 thereof indicates a rate of change of the temperature over time. The drift detector 58 may be configured for comparing the result 108 against a threshold value 112, for example, a temperature change threshold. In case the result 108 exceeds the threshold 112, i.e., 108>112, a compensation trigger 62' may be generated and possibly directly outputted to the device 40 as the signal 62. The signal 62' may be referred to as a compensation trigger indicating that compensation of a drift effect is possible and/or required. Optionally, a further condition may be combined with the trigger 62' which may be represented by an optional AND condition 114 being applied to the trigger 62' in view of an activation signal 116 that may optionally be received. The activation signal 116 may be received, for example, from a user interface, a switch, a communication interface or any other suitable signal source. The activation signal 116 may comprise information whether drift compensation is requested or not and may thus be referred to as a "compensation enable" signal. This allows for outputting the trigger signal 62 only when the trigger signal 62' is generated and additionally the activation signal 116 is received. Alternatively, the trigger signal 62 may be generated based on any other condition including an absence of the AND condition, i.e., the trigger signal 62 corresponds to signal 62'.

That is, the device may comprise a signal input for receiving a control signal, i.e., the activation signal 116, indicating to activate or deactivate compensation of the drift effect. The device is configured for handling the drift effect in accordance with the control signal.

In other words, as the change in temperature $T_{raw}$ may be identified as the trigger for a pressure drift, the drift detector 58 may monitor the rate of change of temperature which triggers the compensation process. The temperature sampling rate may be identified according to the use case. Another configurable component is the temperature threshold 112 which dictates the sensitivity of the compensation triggering mechanism.

Figure 11:
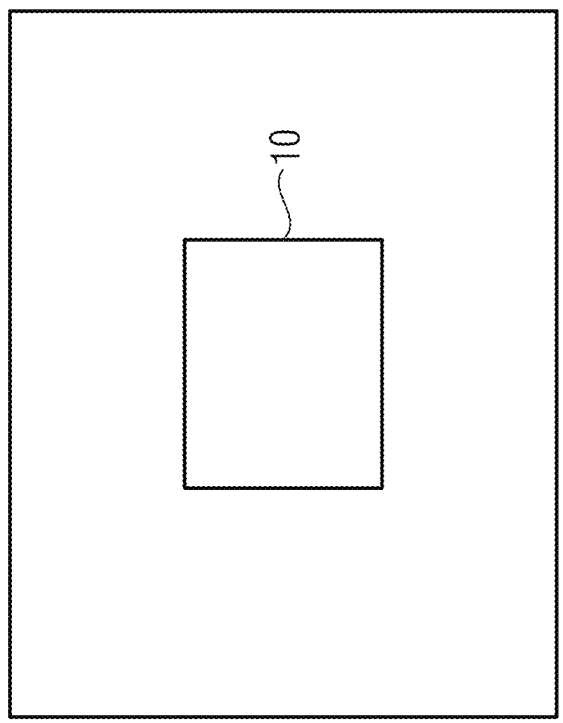
FIG. 11 shows a schematic block diagram of an apparatus according to an embodiment, comprising a device according to an embodiment.

FIG. 11 shows a schematic block diagram of an apparatus no comprising the device 10, wherein alternatively or in addition, also the device 30 and/or 40 may be arranged. The device 110 may be, for example, a drone and/or an unmanned aerial vehicle UAV. Referring again to the example according to which the device 10 is configured a barometric pressure sensor, a sensor drift in the pressure sensor may lead to errors in the determined altitude of the apparatus no. These errors may at least be partially compensated for by the drift effect allowing for a constant and/or precise altitude of the apparatus 110.

Embodiments thus related to adaptive filter for barometric pressure sensors, particularly to a design and a method for an adaptive drift compensation caused by dependent factors like temperature, mechanical stress or the like during the operation of barometric pressure sensors, in particular post-reflow/soldering, i.e., after calibration.

A barometer is an instrument used in meteorology to measure atmospheric pressure. Pressure tendency can forecast short-term changes in the weather. Such short-term changes are useful in predicting turbulences, crests, troughs, etc. in the atmosphere in order to address applications like altitude hold functionality in unmanned aerial vehicles (UAVs). Barometers and pressure altimeters (the most basic and common type of altimeter) are essentially the same instrument but used for different purposes. An altimeter is intended to be displaced vertically, matching the atmospheric pressure to the corresponding altitude, while a barometer is kept stationary and measures subtle pressure changes caused by weather. Hence, the same device can be used interchangeably for a given application. Barometric pressure follows Charles Gauss' Law, which states "At constant pressure a volume of a given mass of ideal gas increases or decreases by the same factor as its temperature on the absolute temperature scale". That is, as temperature increases the gas expands and as temperature decreases the gas contracts. Hence, to address this, barometers employ a temperature sensor and hence, the complete system is referred to as tightly coupled system, as instantaneous accuracy of sensitive barometers is tightly coupled with an instantaneous value of temperature.

Despite all different underlying technologies for implementations of barometers, micro-electro-mechanical-systems (MEMS) sensors constitute a way of implementing such sensors. Such devices integrate a mechanical and an electrical feature embedded into the same structure die. The physical change in the mechanical function is converted into an electrical signal. MEMS sensors encompass both sensing and integrated circuit (IC) die within the same package. The IC die is addressed to provide further processing to the sensing element, e.g., interpreting the electrical signal to a serial computer interface such as the I to C. Accordingly, such MEMS sensor technology is delivered in the form of a system in package (SiP) module, which could easily be interfaced by an embedded computer system, such as a microcontroller unit (MCU).

The advantages of MEMS sensor technology are in agreement with a miniaturized-size device of Lowman's power consumption, low cost and particularly high performance. Due to these beneficial features, different types of MEMS sensors (e.g., accelerometers, gyroscopes or the like) can be found in an abundance of electronic devices, including the most popular ones like smartphones and tablet PCs. An example of such a case is the exploitation of MEMS in digital barometric pressure sensor systems. For instance, a mechanical diaphragm deflection to the sensing membrane of a capacitive pressure sensor results in the change of the measured (output) capacitance. This is then further reported through integrated circuits.

A challenge is given in addressing any non-linearity associated with electro-mechanical features, for example, a non-linear capacitance change or structural non-linearity in piezoelectric sensors. To address these challenges, such sensors (SiP) need to be calibrated during production. In case of a pressure sensor, calibration involves correction of pressure sensor reading based on, for example, analog-digital-conversion (ADC) gain, offset compensation, temperature drift, etc. Such calibration process is carried out in controlled environments to achieve a zero-point in order to meet the desired specification.

Apart from non-linearities, when exposed to certain conditions, the sensors will respond differently depending on the physical properties of the materials chosen. Different sensors may undergo some expansion and contradiction when subjected to pressure and temperature cycles. Pressure change frequency and amplitude, temperature extremes, material responses and environmental changes are factors, each contributing to drift. The magnitude a sensor will drift varies with actual usage of the conditions it is exposed to. Even the calibrated sensor exhibits drift either immediately after soldering/reflow or over the period of time during the operation of the sensor. The former behavior is caused due to mechanical stress that the MEMS devices experience after soldering/reflow and is highly dependent on a type of material a target circuit board has, materials used in engineering, packaging and sensors, etc. The reason this type of drift is seen is because of coefficients of thermal expansion associated with materials used in the sensor. During calibration, when the sensor is not soldered, the sensor chipset and package experience a different stress when compared to a soldered-reflowed sensor.

Embodiments allow for compensating such variations in the behavior due to soldering/reflow and/or aging effects based on an adaptive compensation of the drift effect. The factory calibration, however, is generally carried out in sockets, without soldering of sensors. Therefore, mechanical stress experienced by the sensor before and after soldering may be different despite a similar thermal expansion. Hence, calibration that actually corrects such changes induced by drifts, e.g., temperature changes, sometimes becomes ineffective. Embodiments also solve issues that a pressure sensor drift may be a gradual deep graduation of the sensor and of other components. Such offsets may lead to readings offsets from the original calibrated state. Further, when exposed to certain conditions, the sensors will respond differently depending on the physical properties of the materials chosen, which is compensated for when compensating the drift effect. Further, every sensor may undergo some expansion and contraction when subjected to pressure and temperature cycles. Pressure change frequency and amplitude, temperature extremes, material responses and environmental changes contributing to the drift effect may be compensated. Embodiments allow for preventive or reductive facts that a drift that makes factory calibration of a sensor ineffective and induces error in pressure readout when exposed to constantly changing temperature. Such drift can affect adversely the performance of pressure sensor and makes sensor infeasible for critical applications like attitude hold of UAVs, which is also prevented with the described embodiments. That a drift caused by mechanical stress on sensor and its package, leads to requirements that a recalibration of a sensor after soldering/reflow is performed may be avoided with the present embodiments. Embodiments allow for the differentiating between real barometric pressure change (e.g., change in altitude) from a false pressure change due to drifting of the sensor. Further, drifts may be transient, may occur intermittently and/or may or may not cause a forced/false barometric pressure change event. Embodiments described herein may handle each of the described scenarios. To address these challenges, embodiments describe a concept of adaptive drift compensation filters that differentiate between the real barometric pressure changes from false drift induced pressure changes detected by the pressure sensor. Further, said filter rectifies any of such errors in pressure readouts by dynamically adapting a correction factor with respect to fast and slow barometric pressure changes that do not contribute to force/false pressure change events.

Figure 12:
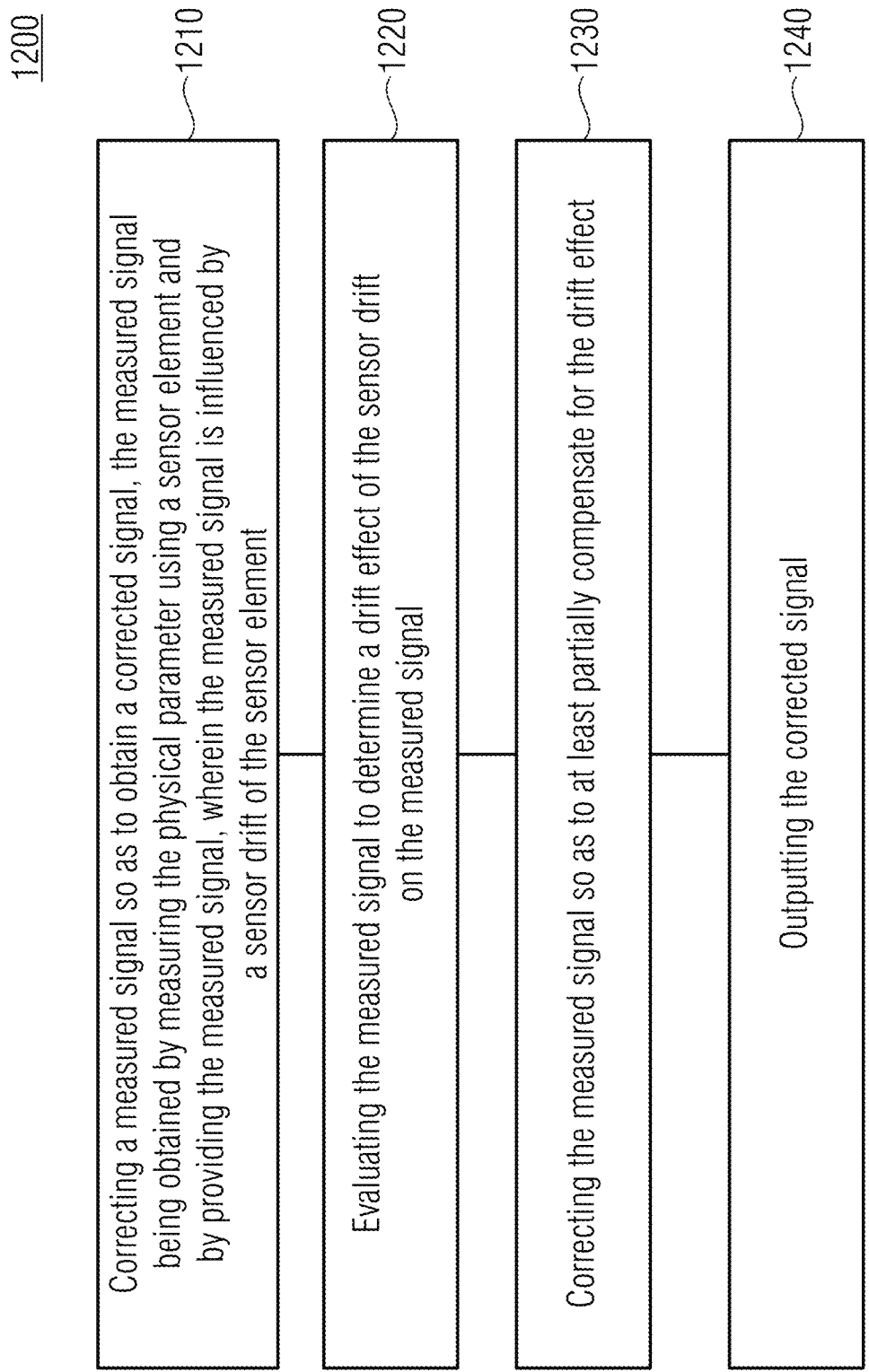
FIG. 12 shows a schematic flowchart of a method for sensing a physical parameter according to an embodiment.

FIG. 12 shows a schematic flowchart of a method 1200 for sensing a physical parameter. Method 1200 comprises a step 1212 comprising correcting a measured signal so as to obtain a corrected signal, the measured signal being obtained by measuring the physical parameter using a sensor element and by providing the measured signal, wherein the measured signal is influenced by a sensor drift of the sensor element. A step 1220 comprises evaluating the measured signal to determine a drift effect on the measured signal.

A step 1230 comprises correcting the measured signals so as to at least partially compensate for the drift effect. A step 1240 comprises outputting the corrected signal.

According to a second aspect that may be used in connection with method 1200, a method comprises combining the measured signal with a correction factor so as to obtain the corrected signal. The method further comprises evaluating the measured signal with a correction factor so as to obtain the corrected signal. The method further comprises evaluating the measured signal to determine the drift effect and adapting the correction factor so as to at least partially compensate the drift effect.

According to a third aspect that may be combined with the first and/or second aspect, the method comprises adapting a correction factor applied to the measured signal for obtaining the corrected signals so as to at least partially compensate for the drift effect; evaluating the measured signal with respect to a fast variation of the measured signal and evaluating the correction factor with respect to a slow variation of the correction factor, wherein the correction factor is updated responsive to a detected fast variation in the measured signal and/or responsive to a detected slow variation of the correction factor.

According to a fourth aspect that may be combined with any of the previous aspects, the method comprises evaluating the measured signal with respect to a fast variation in the measured signal; associating a fast change of the measured signal having a magnitude being greater than a threshold value with a change of the physical parameter and associating a fast change of the measured signal having a magnitude being smaller than a threshold value with the drift effect.

According to a fifth aspect that may be combined with any of the previous aspects, the method 1200 comprises separating a drift component from the measured signal and adapting a reference value of the physical parameter used for determining a correction value used further for correcting the measured signal based on an adaptation of the filter coefficients.

According to a sixth aspect that may be combined with any of the previous aspects, the method 1200 comprises using a variable correction factor for correcting the measured signal and evaluating the correction factor with respect to a slow variation of the correction factor. The method further comprises associating a slow change of the correction factor having a magnitude being larger than a threshold value with a drift effect. The method further comprises updating the correction factor responsive to the drift effect.

According to a seventh aspect that may be combined with any of the previous aspects, the method 1200 comprises correcting the measured signal using a correction factor, wherein the correction factor is updated responsive to a determined change in the physical parameter and responsive to a determined drift effect.

According to an eighth aspect that may be combined with the seventh aspect, for updating the correction factor responsive to the determined change in the physical parameter, method 1200 comprises using an updated reference value of the physical parameter in a polynomial and a filter for filtering a result of the polynomial. The method further comprises adapting the filter parameters of the filter using coefficients indicating the determined drift effect.

According to a ninth effect that may be combined with any of the previous aspects, the method 1200 comprises providing a reference value for a determination of the correction value used for correcting the measured signal. The method further comprises using a determined corrected value of the physical parameter contained in the corrected signal as reference value for a subsequent iteration of drift detection when no drift occurs and for updating the reference value in case of a drift occurs.

According to a tenth aspect that may be combined with any of the previous aspects, the method comprises detecting a presence of the drift effect and controlling the device so as to compensate for the drift effect responsive to the drift effect and so as to skip compensating the drift effect in case no presence of the drift effect is detected.

According to an eleventh aspect that may be combined with any of the previous aspects, a control signal is received, the control signal indicating to activate or deactivate compensation of the drift effect. The method 1200 is performed such that the drift effect is handled in accordance with the control signal.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine-readable carrier.

Other embodiments comprise the computer program for performing one of the methods described herein, stored on a machine-readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A device for sensing a physical parameter, comprising:
   a sensor element configured for measuring the physical parameter and for outputting a corresponding measured signal, wherein the measured signal is influenceable by a sensor drift of the sensor element;
   a corrector for correcting the measured signal output by the sensor element so as to obtain a corrected signal, wherein the corrector is configured for evaluating the measured signal to determine a drift effect of the sensor drift on the measured signal and for correcting the measured signal so as to compensate for the drift effect; and
   a signal output configured for outputting the corrected signal,
   wherein the corrector further comprises:
   a compensator configured for combining the measured signal with a correction factor so as to obtain the corrected signal;
   a drift evaluator configured for evaluating the measured signal to determine the drift effect and for adapting the correction factor so as to compensate for the drift effect;
   a correction factor updater configured for adapting a correction factor applied to the measured signal for obtaining the corrected signal so as to compensate for the drift effect;
   a measured signal evaluator configured for evaluating the measured signal with respect to a fast variation of the measured signal, wherein the measured signal evaluator comprises a fast pressure change detection filter; and
   a correction factor evaluator configured for evaluating the correction factor with respect to a slow variation of the correction factor, wherein the correction factor evaluator comprises a slow pressure change detection filter,
   wherein the corrector is configured to update the correction factor responsive to a detected fast variation in the measured signal and/or responsive to a detected slow variation of the correction factor,
   wherein the corrector comprises a reference value updater configured for providing a reference value for determination of a correction value used for correcting the measured signal, wherein the reference value updater is configured for using a determined corrected value of the physical parameter contained in the corrected signal as reference value for a subsequent iteration of drift detection when no drift occurs and for updating the reference value in case a drift occurs, and
   wherein an output of the fast pressure change detection filter is coupled to a first input of the reference value updater, and an output of the slow pressure change detection filter is coupled to a second input of the reference value updater.

2. The device according to claim 1, wherein the corrector comprises a measured signal evaluator configured for evaluating the measured signal with respect to a fast variation in the measured signal, wherein the corrector is configured for associating a fast change of the measured signal having a magnitude being greater than a threshold value with a change of the physical parameter and for associating a fast change of the measured signal having a magnitude being smaller than a threshold value with the drift effect.

3. The device according to claim 1, wherein the corrector comprises a measured signal evaluator configured for separating a drift component from the measured signal, wherein the corrector is configured for adapting a reference value of the physical parameter used for determining a correction value and further used for correcting the measured signal based on adapted filter coefficients.

4. The device according to claim 1, wherein the corrector is configured for using a variable correction factor for correcting the measured signal, wherein the corrector comprises a correction factor evaluator configured for evaluating the correction factor with respect to a slow variation of the correction factor, wherein the corrector is configured for associating a slow change of the correction factor having a magnitude being larger than a threshold value with the drift effect, and
   wherein the corrector is configured to update the correction factor responsive to the drift effect.

5. The device according to claim 1, wherein the corrector is configured for correcting the measured signal using a correction factor, wherein the corrector comprises a correction factor updater configured for updating the correction factor responsive to a determined change in the physical parameter and for updating the correction factor responsive to a determined drift effect.

6. The device according to claim 5, wherein, for updating the correction factor responsive to the determined change in the physical parameter, the correction factor updater is configured for using an updated reference value of the physical parameter in a polynomial and a filter for filtering a result of the polynomial, wherein the correction factor updater is configured for adapting filter parameters of the filter using coefficients indicating the determined drift effect.

7. The device according to claim 1, comprising a drift detector configured for detecting a presence of the drift effect and for controlling the device so as to compensate for the drift effect responsive to the drift effect and so as to skip compensating the drift effect in case no presence of the drift effect is detected.

8. The device according to claim 1, wherein the device comprises a signal input for receiving a control signal indicating to activate or deactivate compensation of the drift effect, wherein the device is configured for handling the drift effect in accordance with the control signal.

9. The device according to claim 1, wherein the sensor element comprises a barometric pressure sensor, and wherein the drift effect is caused by a temperature variation of the device.

10. The device according to claim 1, wherein the device comprises a drone or unmanned aerial device.

11. The device according to claim 1, wherein the sensor element comprises a MEMS barometric pressure sensor or a MEMS altimeter.

12. The device according to claim 11, wherein the corrector comprises an integrated circuit.

13. The device according to claim 12, wherein the sensor element and the corrector comprise a single package for outputting the corrected signal.

14. A method for sensing a physical parameter, the method comprising:
- correcting a measured signal so as to obtain a corrected signal, the measured signal being obtained by measuring the physical parameter using a sensor element and by providing the measured signal, wherein the measured signal is influenced by a sensor drift of the sensor element;
- using a fast pressure change detection filter, evaluating the measured signal to determine a drift effect of the sensor drift on the measured signal;
- using a slow pressure change detection filter, correcting the measured signal so as to compensate for the drift effect; and
- using a reference value updater, outputting the corrected signal, wherein the reference value updater is configured for providing a reference value for determination of a correction value used for correcting the measured signal, wherein the reference value updater is configured for using a determined corrected value of the physical parameter contained in the corrected signal as reference value for a subsequent iteration of drift detection when no drift occurs and for updating the reference value in case a drift occurs, and wherein an output of the fast pressure change detection filter is coupled to a first input of the reference value updater, and an output of the slow pressure change detection filter is coupled to a second input of the reference value updater.

* * * * *